Nov. 2, 1937.   A. E. HUMMER   2,097,566
CHANGE SPEED GEARING
Filed May 28, 1934   2 Sheets-Sheet 2
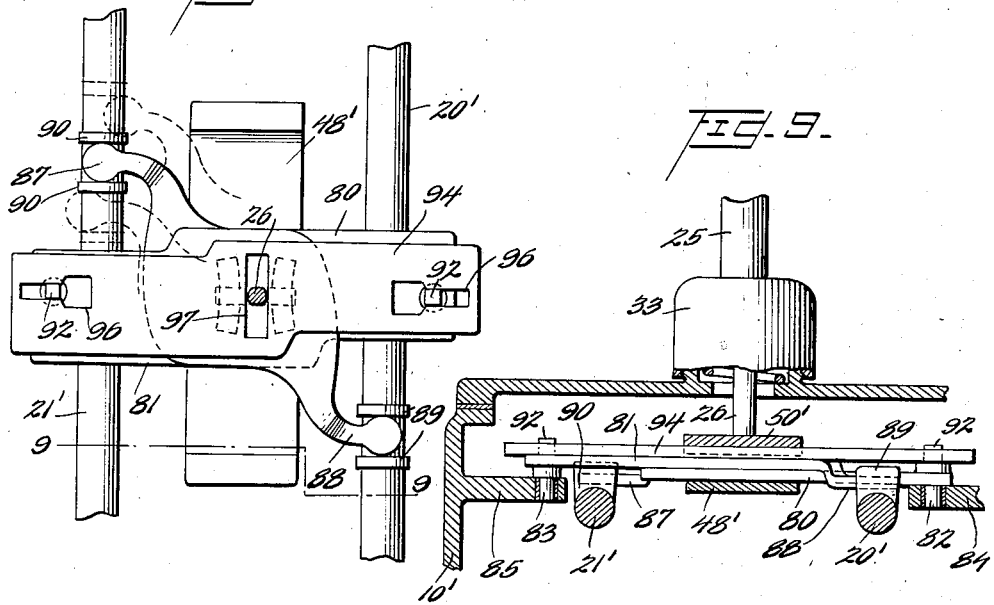
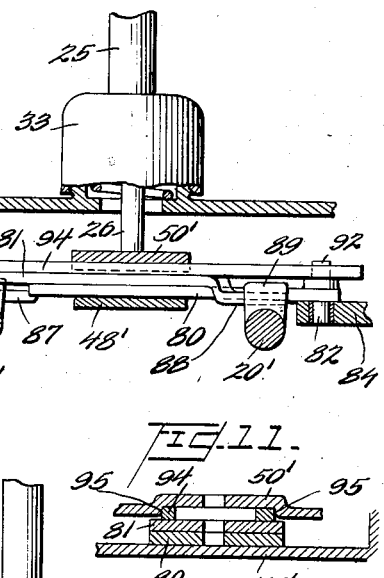
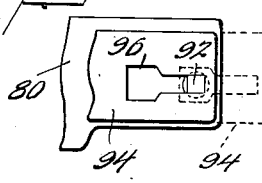
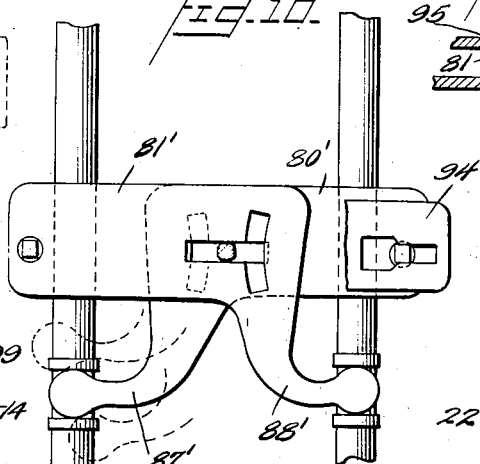
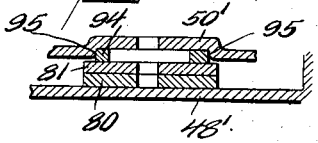
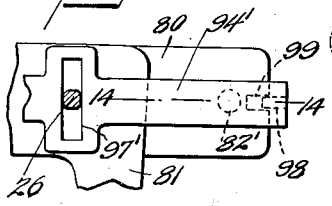
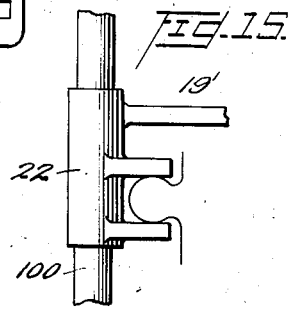
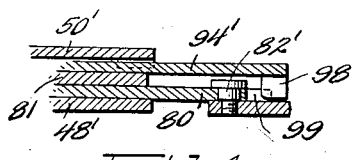
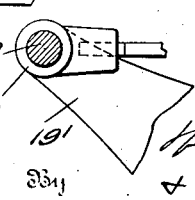

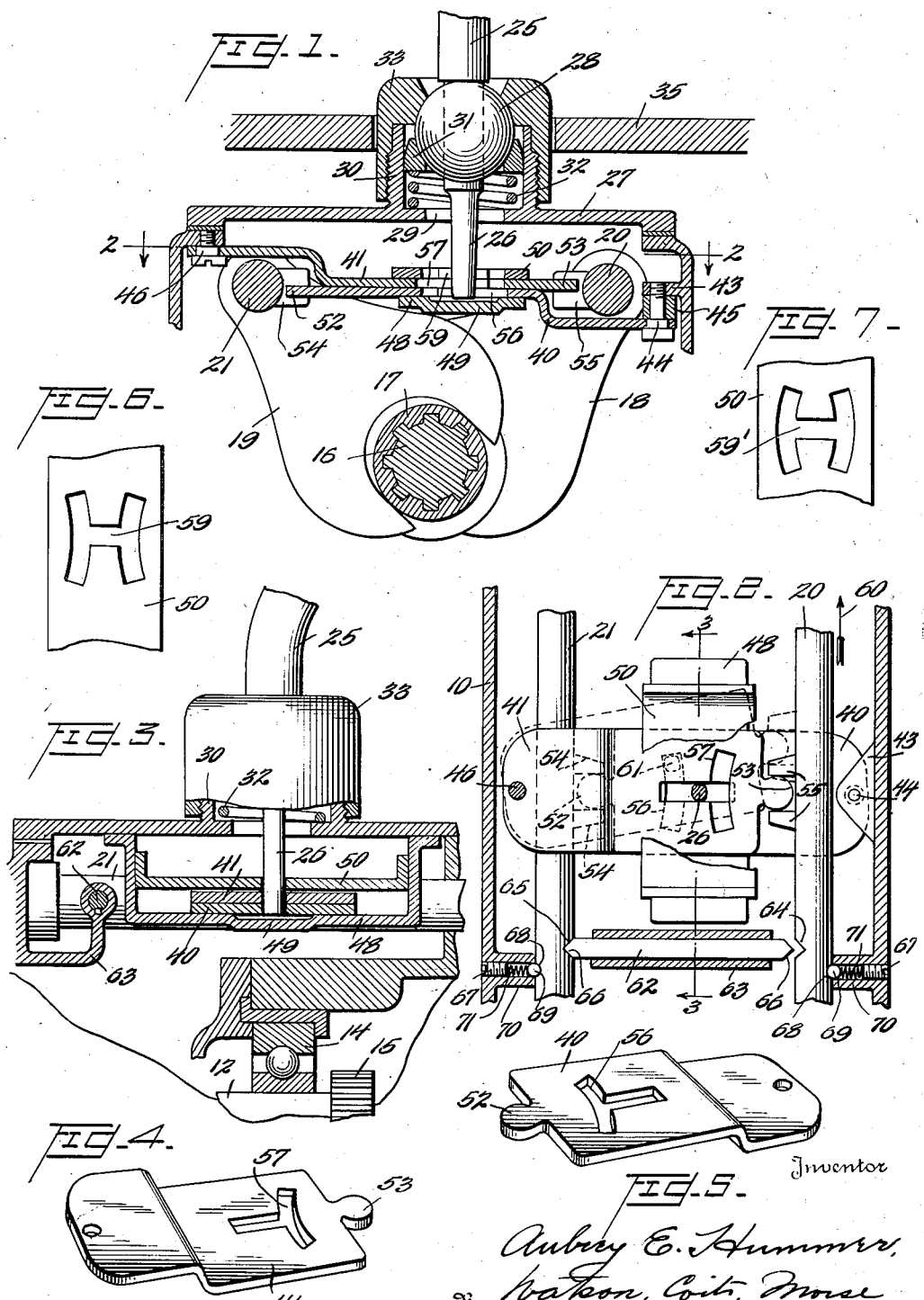

Patented Nov. 2, 1937

2,097,566

UNITED STATES PATENT OFFICE 2,097,566

CHANGE SPEED GEARING

Aubrey E. Hummer, Washington, D. C., assignor to Packard Motor Car Company, Detroit, Mich., a corporation of Michigan Application May 28, 1934, Serial No. 728,024

16 Claims. (Cl. 74—473)

This invention relates to change speed gearing and more particularly to the gear shifting mechanism for such change speed gearing as applied to the power transmission of automobiles, tractors, motor boats or the like. The invention, while lending itself more especially to employment in connection with the common type of automobile transmission, is not limited to this use but is susceptible of other adaptations as will be apparent from the disclosure.

The general object of my invention is to provide a novel and improved gear shift mechanism of this character embodying certain definite advantages of construction, installation, arrangement and operation.

One of the more particular objects of the invention is the provision of an improved operative connection between the manually actuated gear shift lever and the shifter forks or equivalent elements of the change speed gearing, whereby the vertical clearance between the transmission housing and the floor boards of the vehicle may be lessened, and the upwardly projecting housing for the ball joint of the shift lever may be considerably lowered, while at the same time there may be obtained sufficient movement of the gear shifter forks to effectively mesh or clutch the gearing elements.

The expedients which comprise an important feature of my invention not only enable the construction of a more compact change speed gearing assembly and eliminate to a large extent the obstructions encountered in the forward compartment of the vehicle, but accomplish these objects without any substantial loss of leverage or decrease in the extent of effective movement of the shifting mechanism.

In its preferred embodiment, the invention contemplates the provision of a pair of overlapping levers, one end of each of these levers being pivotally supported by a fixed portion of the housing at either side thereof. These levers extend from their pivots inwardly toward each other and terminate in portions which are adapted to operatively engage the shifter members. The intermediate overlapping portions of the levers are provided with suitably shaped slots or apertures for the reception of the lower normally vertically extending end of the shift lever, the arrangement being such that when the shift lever is engaged with one of the overlapping levers in order to actuate the selected shifter member, it will not move the other of said overlapping levers but will pass idly through a portion of the slot therein. Additional means may also be provided for insuring that the idle lever is positively prevented from moving.

Other objects of the invention are the provision of several novel forms of shifter levers; improved supporting and guiding means for said levers and the manually operated shift rod; and specific embodiments of locking devices for rendering one of the shifter levers inoperative when the other is being moved or for locking both of the levers when the shift rod is in neutral position.

Other objects and features of novelty will be apparent from the following specification when read in connection with the accompanying drawings in which certain embodiments of my invention are illustrated by way of example.

In the drawings:

Figure 1 is a fragmentary vertical transverse sectional view of a change speed mechanism embodying the principles of my invention;

Figure 2 is a view in horizontal cross section of a portion of the mechanism taken on line 2—2 of Figure 1;

Figure 3 is a fragmentary vertical longitudinal sectional view taken on line 3—3 of Figure 2;

Figures 4 and 5 are views in perspective of the horizontal shifter actuating levers which comprise an important feature of my invention;

Figure 6 is a plan view of the central portion of a guide plate employed in the gear shift mechanism;

Fig. 7 is a similar view of a modified form of guide plate;

Figure 8 is a detail plan view similar to Figure 2 of another embodiment of my invention;

Figure 9 is a fragmentary vertical transverse sectional view taken on line 9—9 of Figure 8;

Figure 10 is a partial plan view of a further modification of my invention;

Figure 11 is a detail view in vertical longitudinal section of the overlapping levers and guide plates as employed in the embodiment of my invention shown in Figures 8, 9 and 10;

Figure 12 is a fragmentary plan view of one end of the locking plate illustrated in Figures 8-10 indicating its shifted positions;

Figure 13 is a fragmentary plan view of another form of locking lever which may be used in connection with the various types of mechanism illustrated;

Figure 14 is a vertical sectional view taken on line 14—14 of Figure 13; and

Figures 15 and 16 are detail views in plan and transverse cross section respectively of one adaptation of my invention to gear shift mechanism in which fork carrying sleeves are slidable on fixed rods.

Referring now more particularly to Figures 1 and 2 of the drawings, it will be seen that the change speed gearing and its associated operating parts are enclosed in a transmission housing designated by the numeral 10. The transmission gearing, only a portion of which is illustrated in the present disclosure, is such as to afford three forward speeds of the vehicle for a given engine speed and one speed in a reverse direction. The conventional clutch driven shaft 12 enters the forward end of the housing and is supported by bearings 14. A gear 15 is carried upon the rear end of this shaft and is adapted to mesh with a gear on the usual countershaft which is not shown in the drawings. A transmission shaft 16 which is aligned with the clutch driven shaft 12 is shown in Figure 1. This shaft is adapted to be operatively connected directly with the shaft 12 to attain certain speed conditions, and may be driven from the countershaft when other speeds are desired. These parts are conventional and need not be described in detail for the purposes of the present disclosure, but it may be stated that the sleeve 17, which carries certain of the gear and clutch members, is slidable on the transmission shaft 16 and is moved to and from its two engagements by means of the reciprocating fork 18. Another shifter fork 19 controls the engagement of a second slidable assembly by means of which other speed conditions are attained.

These shifter forks 18 and 19 are shown in most of the figures of the drawings as secured to the longitudinally reciprocable shifter shafts 20 and 21 respectively, but, as suggested in Figures 15 and 16, the forks may be mounted on elongated sleeves which are in turn slidably mounted on stationary shafts. For example, the fork 19' is formed with a sleeve 22 which is slidable upon the shaft 100. It will be readily understood that the same operating elements described in connection with the other embodiments may be applied to this modification.

The numeral 25 designates the manually operable gear shift rod or lever, the upper end of which is broken away for convenience of illustration. The lower end 26 of the shift rod is preferably attenuated and is adapted to operate the shifter forks through mechanism which will be later described. The shift lever or rod 25 may be mounted on the transmission lid or cover 27 by means of a universal joint comprising the ball 28 carried by the lever and suitable bearings for the ball carried by the cover 27. An opening 29 is formed in the cover and an annular hollow boss 30 surrounds the opening and projects upwardly around the lever 25. A bearing member 31 is slidably carried within the boss 30 and is resiliently urged upwardly against the ball 28 by means of the coil spring 32. A bearing cap 33 is threaded to the boss 30 and provides the upper seat member for the ball 28. It will be understood that the ball joint members project through an opening in the floor boards 35 of the vehicle, but not to such a great extent as in devices heretofore employed.

The manipulation of the shift rod 25 is substantially the same as in standard devices of this character, that is, the movement of both the upper and lower ends of the rod is adapted to follow an H-shaped path of movement, the position corresponding to the cross bar of the H being the neutral or disengaging position, and the positions at the terminal arms of the H being respectively those which will attain low, intermediate and high forward speeds and the reverse movement of the car.

As already pointed out, an important feature of my invention relates to the novel mechanism which I have provided for shortening the lower arm 26 of the shift rod 25 and yet transmitting the movement of the lower end of the shift rod to the shifter forks 18 and 19 without substantial change in mechanical advantage or extent of movement of the shifter forks necessary to effect the change of speed. These advantages are attained by the use of a pair of horizontal overlapping plate-like levers such as those indicated by the reference numerals 40 and 41 in Figures 1-5 of the drawings. In the illustrated embodiments of the invention, these levers are pivoted to stationary parts of the transmission assembly on either side thereof, and are adapted to extend across the upper portion of the housing in close proximity to the shifter shafts 20 and 21.

The lever 40, for example, may be pivoted to the bracket or lug 43 formed on the side wall of the transmission housing 10 by means of the bolt 44, a spacing sleeve 45 being provided to accommodate the offset portion formed in the lever 40 to enable it to avoid the shifter shaft 20. Similarly one end of the lever 41 is pivoted to an opposite portion of the housing 10 by means of the bolt 46. The lever 41 may also be formed with an offset portion to clear the shifter shaft 21. The mutually inwardly projecting portions of the levers 40 and 41 are arranged in overlapping relation and are supported by the bracket 48 which may be secured to any suitable portion of the housing 10 or its cover plate 27. The central portion of the supporting plate or bracket 48 may be depressed as at 49 to afford a clearance space for the lower end of the shift lever. An upper supporting and guiding plate 50 may be welded or otherwise secured to the lower plate 48.

The free ends of the levers 40 and 41 are provided with rounded projections 52 and 53 which are adapted to engage respectively between the lugs 54 and 55 provided on the shifter shafts 21 and 20.

The intermediate overlapping portions of the plate levers 40 and 41 are provided with means whereby the lower end 26 of the shift lever 25 may be selectively engaged with and actuate one of the levers in either direction from neutral position. This means comprises the substantially T-shaped apertures or slots 56 and 57 formed in the levers and extending in opposite directions. When both levers are in substantial alignment, the upright portions or stems of the T-shaped slots are in registry as indicated in Figure 2 of the drawings. It will be readily seen from this figure that the combined superposed T-shaped slots in the two levers form an H-shaped configuration when in this neutral position. The lower end 26 of the shift rod is shown projecting through both of the upright portions of the T-shaped slots and disposed centrally thereof. To guide the movements of the shift rod in its H-shaped path, the superposed plate or bracket 50 is provided with an H-shaped slot 59 as shown in Figure 6 of the drawings.

Now suppose that it is desired to shift the fork carrying shaft 20 in the direction of the arrow 60 in Figure 2, the lower end 26 of the shift rod 25 may be moved to the left in this figure and then away from the observer to the dotted line position 61. During this movement it will be seen that the shift rod member 26 is first moved to the base of the T-slot 57 in the lever 41 but will occupy the central head portion of the slot 56 in lever 40. Then during its longitudinal movement to the position 61, the rod portion 26 will cause the lever 41 to rotate about its pivot and, through the projection 53 and lugs 55, move the shifter shaft 20 in the desired direction. The shifted positions of these parts are indicated in dotted lines in Figure 2. It will be realized that this substantially longitudinal movement will have no effect upon the lever 40 since the shift rod will move in the arcuate head portion of the T-slot 56.

It will be noted that the heads of the T-slots and the upright portions of the H-slots are illustrated in the drawings as being of slightly arcuate form to accommodate the movement of the shift rod about the fixed pivots 45 and 46 of the plate levers 40 and 41. This particular form of the slots is not absolutely necessary however. If the slot in the guide plate 50 is of an H-shape with straight upright portions, as in the usual construction, instead of arcuate, the heads of the T-shaped slots in the swinging levers need only be made of widths which will offer sufficient clearance for the lower end 26 of the shift lever in its resulting rectilinear movement.

A corresponding movement of the shift lever part 26 from the neutral slot toward the observer will, of course, slide the shifter shaft 20 in the opposite direction to that previously described to effect the other engagement of its associated yoke or fork 18.

From the foregoing description of the movements of the shaft 20 it is thought that the operation of the shifter shaft 21 in either direction will be clearly understood. In effecting this movement, the shifter shaft portion 26 will be moved toward the right in Figure 2 and toward or from the observer in the head of the slot 57. This will effect the movement of the lever 40 and consequently of the shaft 21 while the lever 41 and shaft 20 remain in neutral position.

It may be noted at this point that if other forms or modes of manipulation of the shift lever 25 be desired, the forks 18 and 19 which operate the shiftable gearing or clutches could be changed from one of the shifter shafts 20 or 21 to the other, or the position of the T-slots or apertures 56 and 57 could be formed in reversed positions in the levers 40 and 41. This would means that the effective points of engagement of the rod portion 26—namely, the feet of the upright portions of the T-slots—would be positioned more remotely from the respective pivots of the levers 40 and 41. This would mean a very slight gain in mechanical advantage and an equally slight loss of "throw" or extent of movement of the forks. In this latter case, if the arcuate slot guide plate is adopted instead of a rectilinear H-shaped slot, the curvature of the heads of the T-slots and the upright arcuate members of the H-slot 59 in the guide plate 50 would have to be reversed, as suggested in Fig. 7 of the drawings.

In order to insure that the fork not being manipulated shall be restrained in its neutral or idle position, any desired form of locking means may be applied. One example of such a device is shown in Figures 2 and 3 of the drawings, and comprises the sliding pin 62 carried by the bracket 63 and disposed between the shafts 20 and 21. Notches 64 and 65 are formed in the shafts and are adapted to be alternatively engaged by the tapered ends 66 of the pin 62. It will be seen that when, for example, the shaft 20 is reciprocated, the cooperating tapered walls of the notch 64 and projections 66 will cause the pin 62 to move into the notch 65 in the opposite shaft 21 and securely retain it in neutral position. In order to afford a slight resistance to the initial movement of the shafts from neutral position, the detent members 67 may be provided in connection with each of the shafts 20 and 21. A spherical depression 68 is formed in each of the shafts and is adapted to be engaged by the ball 69 which is carried by the boss 70 and resiliently urged toward the shaft by means of the coil spring 71. Any other form of locking device, such as suitable adaptations of the locking plates described in connection with other embodiments of this invention, may be employed in connection with the form shown in Figures 1-5.

In Figures 8 and 9 I have illustrated an alternative form of my invention in which the overlapping levers are disposed upon the same side of the plane of the shifter shafts 20 and 21. In this case the effective engagement of the inner ends of the levers with the shafts 20 and 21 is attained by offsetting these ends horizontally from the main overlapping portions of the levers. In these figures the horizontal plate-like levers 80 and 81 are provided at their outer ends with pivot pins 82 and 83 which are suitably mounted in the brackets 84 and 85 carried by the transmission housing 10'. The intermediate overlapping portions of levers 80 and 81 are provided with T-shaped slots which cooperate with each other and with the shift rod 26 as in the case of the embodiments already described. The levers 80 and 81 are provided with horizontally offset extensions or prongs 87 and 88, the ends of which engage between the upwardly projecting lugs 89 and 90 formed on the shifter shafts 20' and 21'. The overlapping levers 80 and 81 may be supported by the bracket 48' and the superposed guide plate or bracket 50', the latter plate being provided with an H-shaped guide slot as in the other embodiments.

The locking means provided in the present embodiment for restraining the movement of the shaft 20' or 21' which is not being shifted, involves the following arrangement. Each of the levers 80 and 81 are provided adjacent their pivots 82 and 83 with upwardly projecting squared lugs 92. A locking plate 94 is superposed upon the upper lever 81 and is retained for transversely sliding movement only by the shoulders 95 formed on the underside of the plate 50' by bending the plate 50' or in any other desired manner. Each end of the locking plate 94 is provided with a keyhole slot or aperture 96 which is adapted to receive the adjacent squared lug 92. The midportion of the locking plate 94 is provided with a narrow elongated slot or aperture 97 which receives the end 26 of the shift rod and permits longitudinal movement of the rod without displacing the locking plate 94. However, upon movement of the rod 26 from side to side preparatory to shifting either of the shafts 20' or 21', the locking plate 94 is moved transversely and one of the lugs 92 is received in an enlarged portion of the adjacent keyhole aperture 96 to permit the rotation of the lever 80 or 81 on which it is formed, while the other lug 92 is received within the narrowed portion of the corresponding keyhole opening and is rigidly restrained from movement. Figure 8 clearly shows the neutral position of the locking plate and shifting levers while the fragmentary view shown in Figure 12 shows two adjusted positions of the locking plate in solid and dotted lines.

Figure 10 illustrates a further modification of my invention in which the horizontal lever extensions 87' and 88' are indicated as extending upon one side only of the two levers 80' and 81'. The same type of locking plate 92 may be employed in this connection. Figures 9 and 11 may well be taken to represent sectional views of either the modification shown in Figure 8 or the embodiment illustrated in Figure 10.

In Figures 13 and 14 there is illustrated an alternative form of locking plate 94' which may be employed in the same way as that described in the other embodiments. It will be noted that the central portion of this locking plate is provided with a slot 97' whereby it may be shifted laterally by means of the lower end 26 of the shift lever and is adapted in the following manner to perform its locking function. Each end of the plate is provided with a depending projection 98 which is adapted to enter the kerf or notch 99 in the end of one of the levers 80 or 81 thus effectively restraining the movement of the lever about its pivot 82'. The movement of the locking plate 94' may be limited to a transverse direction by means of suitable lugs 95' formed on the superposed guide plate 50' as indicated in Figure 14.

It has already been indicated how the same shifting means described in connection with shafts 20, 21 and 20', 21' may be employed in connection with a fork 19' which is provided with a sleeve 22 slidable on a fixed shaft 100 as clearly shown in the fragmentary Figures 15 and 16 of the drawings.

Various other changes and modifications in addition to those suggested herein may be made in the embodiments illustrated and described without departing from the scope of the invention as defined in the following claims.

Having thus described the invention, what is claimed as new and desired to be secured by Letters Patent is:

1. In a change speed mechanism including gearing and a housing therefor, in combination, shifter members, a pair of levers arranged in overlapping relation for a portion of their lengths and having fixed pivots at their oppositely projecting ends, the other ends of said levers respectively operatively engaging said shifter members, a shift lever intersecting said overlapping levers, cooperating means on said levers whereby said shift lever may selectively engage and actuate either one of said levers, said means comprising oppositely extending, substantially T-shaped slots formed in said overlapping levers, the upright arms of said T-shaped slots adapted to be in substantial registry when the levers are in unshifted or neutral positions.

2. In a change speed mechanism including gearing and a housing therefor, in combination, shifter members, a pair of levers arranged in overlapping relation for a portion of their lengths and having fixed pivots at their oppositely projecting ends, the other ends of said levers respectively operatively engaging said shifter members, a shift lever intersecting said overlapping levers, cooperating means on said levers whereby said shift lever may selectively engage and actuate either one of said levers, said means comprising oppositely extending, substantially T-shaped slots formed in said overlapping levers, the upright arms of said T-shaped slots adapted to be in substantial registry when the levers are in unshifted or neutral positions, and a guide plate superposed upon said levers and having a substantially H-shaped slot therein.

3. In a change speed mechanism including gearing and a housing therefor, gear shifter members, a pair of levers, each pivotally mounted at one of its ends within said housing and extending in overlapping relation toward the other, the overlapping portions of each lever being provided with slots, a shift lever passing through said slots, different portions of said slots being adapted to be brought into registry during the movements of said shift lever, supporting and guiding plates embracing portions of said overlapping levers, one of said plates being provided with a guide slot adapted to accommodate all of the movements of said shift lever which passes therethrough, and a locking plate associated with both of said overlapping levers and adapted to be shifted by said shift lever to restrain one of said levers from movement when the other is rotated, and means on one of said supporting and guiding plates for guiding said locking plate.

4. In a change speed mechanism including gearing and a housing therefor, gear shifter members, a pair of levers, each pivotally mounted at one of its ends within said housing and extending in overlapping relation toward the other, the overlapping portions of each lever being provided with slots, a shift lever passing through said slots, different portions of said slots being adapted to be brought into registry during the movements of said shift lever, supporting and guiding plates embracing portions of said overlapping levers, one of said plates being provided with a guide slot adapted to accommodate all of the movements of said shift lever which passes therethrough, and a locking plate associated with both of said overlapping levers and adapted to be shifted by said shift lever to restrain one of said levers from movement when the other is rotated, and to restrain the movement of both of said levers when said shift lever is in a neutral position, and means on one of said supporting and guiding plates for guiding said locking plate.

5. In a change speed mechanism including gearing and a housing therefor, in combination, shifter members, a pair of levers arranged in overlapping relation for a portion of their lengths and having fixed pivots at their oppositely projecting ends, the other ends of said levers respectively operatively engaging said shifter members, a shift lever intersecting said overlapping levers, and cooperating means on said levers whereby said shift lever may selectively engage and actuate either one of said levers.

6. In a change speed gearing mechanism, in combination, shifter members, a pair of overlapping levers pivoted on opposite sides of said mechanism and each operatively connected with one of said members, a shift lever adapted to selectively engage and actuate one of said first named levers, and a locking plate extending from one pivot point of said levers to the other, operatively connected with said shift lever and provided with keyhole slots, squared lugs on said levers adjacent the pivots adapted to be alternatively seized by the narrowed portions of the adjacent keyhole slot, whereby one of the levers is restrained from movement when the other is moved.

7. In a change speed gearing mechanism, in combination, shifter members, a pair of overlapping levers pivoted on opposite sides of said mechanism and each operatively connected with one of said members, a shift lever adapted to selectively engage and actuate one of said first named levers, and a locking plate extending from one pivot point of said levers to the other, operatively connected with said shift lever and provided with squared lugs, and kerfs formed on said levers and adapted to be alternatively engaged by said lugs, whereby one of the levers is restrained from movement when the other is moved.

8. In a gear shift mechanism, in combination, shifter members, a pair of overlapping levers, each pivoted at an end remote from the pivoted end of the other of said levers, the other ends of said levers being laterally offset from the overlapping portions of the levers and operatively connected with said shifter members.

9. In a change speed gearing mechanism, in combination, shifter members, a pair of overlapping levers pivoted on opposite sides of said mechanism and each operatively connected with one of said members, a shift lever adapted to selectively engage and actuate one of said first named levers, a locking plate, restraining means on said locking plate, cooperating elements on said overlapping levers closely adjacent the pivotal points thereof and adapted to be alternatively engaged by certain of said restraining means, whereby one of the levers is held stationary when the other is moved.

10. In a change speed mechanism including gearing and a housing therefore, in combination, a pair of spaced gear shifter members disposed within said housing and each adapted to be moved a limited distance in either direction along substantially parallel lines; a pair of levers disposed in the space between said members, extending substantially transversely with respect to said pair of shifter members, in a generally parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever.

11. In a change speed mechanism including gearing and a housing therefore, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, said cooperating selective engagement means on said first named levers comprising oppositely extending T-shaped slots formed in said levers into which said shift lever passes, portions of said slots being in registry during all operative positions of said levers.

12. In a change speed mechanism including gearing and a housing therefore, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, said cooperating selective engagement means on first said named levers comprising oppositely extending substantially T-shaped slots formed in said levers through which said shift lever passes, the upright arm of said T-shaped slots adapted to be in substantial registry when the levers are in unshifted or neutral position, and the cross portions or heads of said T-shaped slots being arcuate in shape, and the center of curvature of each of said arcuate slots being the fixed fulcrum point of the other lever, whereby the point of engagement of the shift lever with each of the other levers is substantially constant during each respective actuating movement.

13. In a change speed mechanism including gearing and a housing therefore, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, and a locking member directly operable upon each of said first named levers and directly shiftable by said shift lever to restrain either one of the levers from movement when the other is moved.

14. In a change speed mechanism including gearing and a housing therefore, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, both of said first named levers being disposed upon one side of the plane of said shifter members, and each of the ends thereof which is operatively connected with one of the shifter members being offset laterally within the plane of said lever from the remaining portions of said lever.

15. In a change speed mechanism including gearing and a housing therefore, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, over-lapping portions of said first named levers disposed between said spaced parallel shifter members, the fulcrumed end of one of said levers extending upon one side of the plane of said members and the fulcrumed end of the other of said levers extending upon the opposite side of the plane of said members.

16. In a change speed mechanism including gearing and a housing therefor, in combination, a pair of spaced gear shifter members disposed within said housing and each adapted to be moved a limited distance in either direction along substantially parallel lines; a pair of levers extending transversely of said pair of shifter members, disposed generally in parallel relation with each other, and each operatively associated respectively with one of said gear shifter members; a manually operable shift lever having a portion disposed within said housing and extending toward the space between said shifter members, cooperating means on the intermediate portions of said first named levers for the selective engagement and actuation by said portion of the shift lever; the respective oppositely disposed ends of said first named levers being operatively connected with said shifter members, and the other ends of said levers having fixed fulcrum connections with portions of said housing, whereby the fulcrumed end of one of the levers and the end of the other lever which is connected with its respective shifter member lie upon the same side of the intermediately disposed points of engagement of said levers by the shift lever, said cooperating selective engagement means on said first named levers comprising oppositely extending angular slots formed in said levers into which said shift lever passes, portions of said slots being in registry during all operative positions of said levers.

AUBREY E. HUMMER.